United States Patent [19]

Lescoffit

[11] Patent Number: 5,783,003
[45] Date of Patent: Jul. 21, 1998

[54] TIRE WITH REINFORCEMENT COMPRISING CORD SEGMENTS

[75] Inventor: Claude Lescoffit, Clermont-Ferrand, France

[73] Assignee: Compagnie Generale des Etablissements Michelin-Michelin & Cie, France

[21] Appl. No.: 614,709

[22] Filed: Mar. 13, 1996

[30] Foreign Application Priority Data

Mar. 16, 1995 [FR] France .................. 95 03300

[51] Int. Cl.⁶ .................. B60C 9/00; B60C 9/18; B60C 9/20; B60C 9/22
[52] U.S. Cl. .................. 152/451; 152/526; 152/527; 152/530; 152/531; 152/555; 156/406.4
[58] Field of Search .................. 152/526, 531, 152/542–543, 548, 555, 558, 527, 556, 451, 530; 156/406.4

[56] References Cited

U.S. PATENT DOCUMENTS

| | | | |
|---|---|---|---|
| 3,077,915 | 2/1963 | Weber | 152/555 X |
| 3,095,026 | 6/1963 | Weber | 152/527 X |
| 3,095,027 | 6/1963 | Weber | 152/527 X |
| 3,570,574 | 3/1971 | Marker et al. | 152/531 X |
| 3,802,478 | 4/1974 | Boustany et al. | 152/527 |
| 3,990,493 | 11/1976 | Caretta | 152/527 X |
| 4,167,130 | 9/1979 | Miller. | |
| 4,791,973 | 12/1988 | Davisson | 152/531 X |
| 5,529,104 | 6/1996 | Delias et al. | 152/555 X |

FOREIGN PATENT DOCUMENTS

| | | | |
|---|---|---|---|
| 197334 | 4/1908 | Germany. | |
| 1174493 | 4/1960 | Germany. | |
| 1085781 | 7/1960 | Germany | 152/526 |
| 1091890 | 10/1960 | Germany | 152/531 |
| 62-152834 | 7/1987 | Japan | 152/527 |
| 62-231802 | 10/1987 | Japan | 152/531 |
| 62-273837 | 11/1987 | Japan | 152/531 |
| 63-106104 | 5/1988 | Japan | 152/531 |
| 2108439 | of 1883 | United Kingdom. | |

OTHER PUBLICATIONS

French Search Report.
Patent Abstracts of Japan JP 60224530.
Patent Abstracts of Japan JP 62231802.

*Primary Examiner*—Adrienne C. Johnstone
*Attorney, Agent, or Firm*—Alan A. Csontos; Robert R. Reed

[57] ABSTRACT

A tire includes incisions in a ply of parallel cords of the tire, made prior to the ply's utilization for making the tire. A cutting device for making the incisions is comprised of a reference holder to impose a known orientation to the parallel cords. It is comprised of a blade of a given width C, the blade being positioned transversely relative to the known orientation, the device including an assembly for causing the cutting of the cords by the blade, and including an assembly for moving the blade transversely relative to the holder, and an assembly for moving the ply longitudinally relative to the holder.

12 Claims, 6 Drawing Sheets

TIRE WITH REINFORCEMENT COMPRISING CORD SEGMENTS

BACKGROUND OF THE INVENTION

The present invention relates to a tire, a device for selectively cutting the cords of a ply of a tire, and a method for selectively cutting the cords of a ply of a tire. It is known that tires are commonly reinforced by cables or assemblies or cords, which are designated generically by the term "cord" in the present application. An important parameter of structure is the angle formed by these cords relative to a normalized reference very familiar to the professionals, that is, the median plane perpendicular to the axis of rotation of the tire. The present patent application refers particularly to reinforcements at zero degrees.

The state-of-the-art knows many examples of utilization of cords at zero degrees to reinforce the sidewalls or the crown of tires. Let's cite as an example the application EP 0,676,304 or the published application JP 62/231802. The introduction of cords at zero degrees to reinforce the tires presents many well-known advantages, and it is not the intention of the present application to repeat them. But such an introduction has the major disadvantage of not adapting itself to the shaping or shapings encountered during the various phases of production of a tire.

To provide a solution to these problems of shaping, a well-known technique consists of cutting the cords at zero degrees into segments. It is agreed to call a "segment" the section of cord included between the cuts. The length L of such a segment is a dimensioning parameter of the tire. German Patent DE 1091890 illustrates this technique. It describes a method of producing a tire comprised of a crossed carcass on which is placed a belt comprised solely of cords at zero degrees. These cords are not continuous circumferentially. The reinforcement laid along a perimeter is comprised of a certain number of successive segments. The belt is formed by repeating laterally the same arrangement, with a circumferential offset between two adjacent cords at zero degrees, such that the cuts separating the segments are positioned in staggered rows. By "laterally", we designate a position situated adjacent to the reference position, and approximately at the same level in the thickness of the tire. In a crown ply, a lateral position is a position offset axially relative to the reference position, while in the sidewall, the offset would be radial. More generally, in a production process by successive layers, "laterally" signifies adjacent in the same layer. Thus, at the time of shaping, the extremities of the segments move away from each other. There remains however an overlap between adjacent segments laterally. Through dimensioning, this overlap can be adjusted so that it is sufficient to provide, the structure of reinforcement of the tire being fixed through vulcanization, return of the forces of extension oriented circumferentially.

This well-known principle proves to be very interesting. Unfortunately, it has not met with success at the industrial level. It leads in fact to extremely slow rates of positioning cords at zero degrees if the reinforcement is constructed by laying a single transversely wound cord, that is, wound on the green tire during confection by causing the green tire to turn and by moving a cord guide head laterally while coordinating these two movements in order to obtain the expected positioning pitch and cord density. If it is planned to lay a single ply, for example by winding said ply in one turn on the green tire during its assembly, it is necessary to prepare in advance the desired incisions on said ply. It is quite difficult to guarantee in this case that all of the expected cords are cut exactly.

The problem not overcome at this time involves being capable, at strictly predetermined locations in a ply of parallel cords, of cutting exactly all the cords there where one wants to create segments. This problem should take account of realistic tolerances on the relative positioning of the cords relative to the cutting tool.

This problem is particularly difficult when one is cutting not an individual cord to remove some segments from it, but when one wants to prepare a ply of cords. In this case, it is not possible to hold on all sides the cord which must be cut. The cord can be displaced by the action of the blade and escape from it laterally. In this case, if one consults for example FIG. 1 of Patent DE 1091890 cited above, the practical result obtained in industrial utilization is that some of the cuts are not done. In this case, one imagines that the structure made lends itself to shaping much less readily than desired. Or even worse, since cutting defects are random, the tire is shaped in a non-homogeneous manner.

SUMMARY OF THE INVENTION

The invention has the objective of solving this problem. The invention therefore aims at being able to use plies of cords at zero degrees for the advantage which this method presents of allowing very short cycle times at the stage of assembling the tire on a drum.

The invention aims at proposing a technique for preparation of cuts in a ply of parallel cords. The invention finds an especially interesting application when this ply is intended to be placed on the green tire to constitute a reinforcement at zero degrees. The preparation technique must be reliable enough so that one can guarantee that all of the desired cuts have actually been done.

The invention proposes a cutting device for a ply of parallel cords, comprised of a reference holder to impose a known orientation to said parallel cords, comprised of a blade of given width C, said blade being positioned transversely relative to said known orientation, the device comprised of the means for causing the cutting of said cords by said blade, and comprised of the means for moving said blade transversely relative to the holder by a pitch of a distance less than twice said width C, and the means for moving said ply longitudinally relative to said holder.

Between each of the incisions, one therefore leaves a space smaller than the width of the incisions. The desired purpose is that the number of cords not cut between each incision is less than the number of cords cut by each incision. For example, if one wants to leave four cords not cut, the width C of the blade is such that each incision cuts at least six cords, that is, two additional cords. Next, the ply is offset longitudinally relative to the blade by a fraction of the pitch, the pitch being conditioned by the length L of the segments. Typically, this offset corresponds to a half-pitch. At this longitudinal position, incisions are made in the same way, except, and this is an important aspect of the invention, this time the incisions are done staggered relative to the previous cuts, and with some overlap.

The invention also extends to a tire whose structure of reinforcement is comprised of segments of approximately rectilinear cords laid parallel to each other and inclined with respect to the circumferential direction of the ply at a given angle α, each segment having two extremities, said segments being disposed in a manner to include the following repetitive arrangement: one or several intermediate segments of length M, bordered laterally on each side by a lateral segment of length L longer than M, each of said lateral segments being disposed partly coextensive with an intermediate segment and partly extending beyond one of the ends of said intermediate segment, said extending beyond parts of each of the lateral segments each being situated circumferentially on one side of said intermediate segment or segments, and inclined at the angle α respectively on each side of said intermediate segment or segments, each of the extending beyond parts itself bordered laterally by another intermediate segment.

In some way, the invention rests on the observation that, in a reinforcement of cords at zero degrees, the quantity of cords at zero degrees anticipated by the tire designer is or can easily be set at a slightly excessive level. The intermediate cords do not have the length planned for the segments. Typically, this length is reduced by half. The reinforcement of cords at zero degrees produced in this manner has approximately the same effect of blockage of the circumferential extension as if the intermediate cords did not exist. The presence of intermediate cords does not conflict with the proper transmission of force between the lateral cords.

Let's again consider the problem which exists in guaranteeing that all of the cords situated beneath the blade are actually cut by the blade. One can observe that, in the scope of the present invention, if some cords are displaced laterally and are not cut by the action of the blade, the consequence is simply that there will not be any cord which one qualifies as intermediate, and that one increases (especially since there are some missing intermediate cords) the number of segments of cords having the desired theoretical length L. We have seen that a tire made in this way benefitted from some properties which one wants to give it by the presence of cords at zero degrees. It has also been observed that its shaping remains quite homogeneous, even if one does not perfectly control the number or even the presence of intermediate cords between the so-called "lateral" groups of segments of cords.

The invention will be perfectly understood owing to consultation of the following description, illustrating with the help of the attached figures and in a non-restrictive way, some concrete examples of realization allowing to obtain all of the advantages which one can expect from it. All of the explanations given in what follows concern more particularly reinforcements at zero degrees. However, the invention could find an application particularly each time that similar problems of shaping arise. That can concern a wider range of angle α, for example, included between 0° and 20°.

DETAILED DESCRIPTION OF THE PREFERRED EMBODIMENTS

Figure 1:
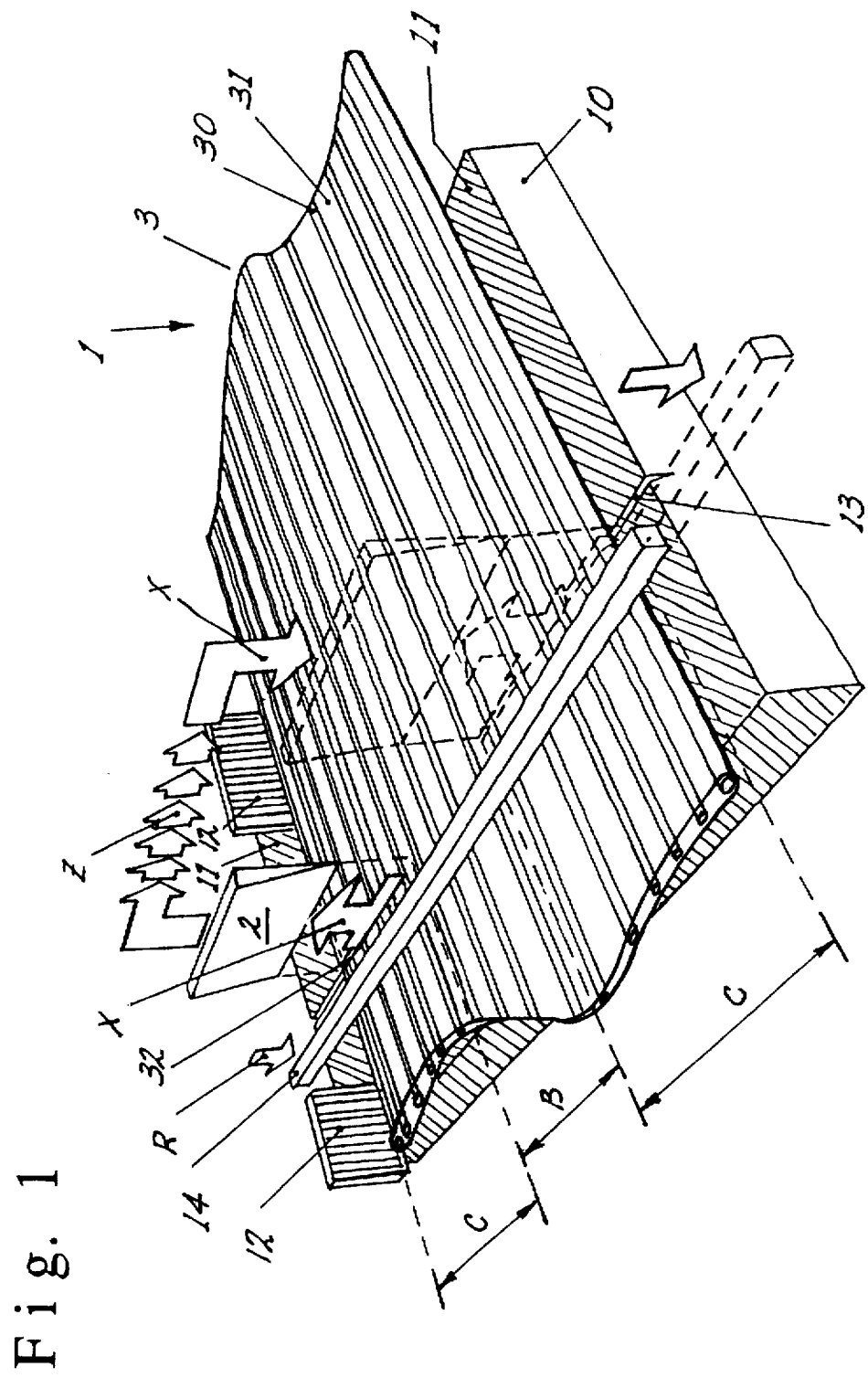
FIG. 1 illustrates a cutting device according to the invention.
Figure 2:
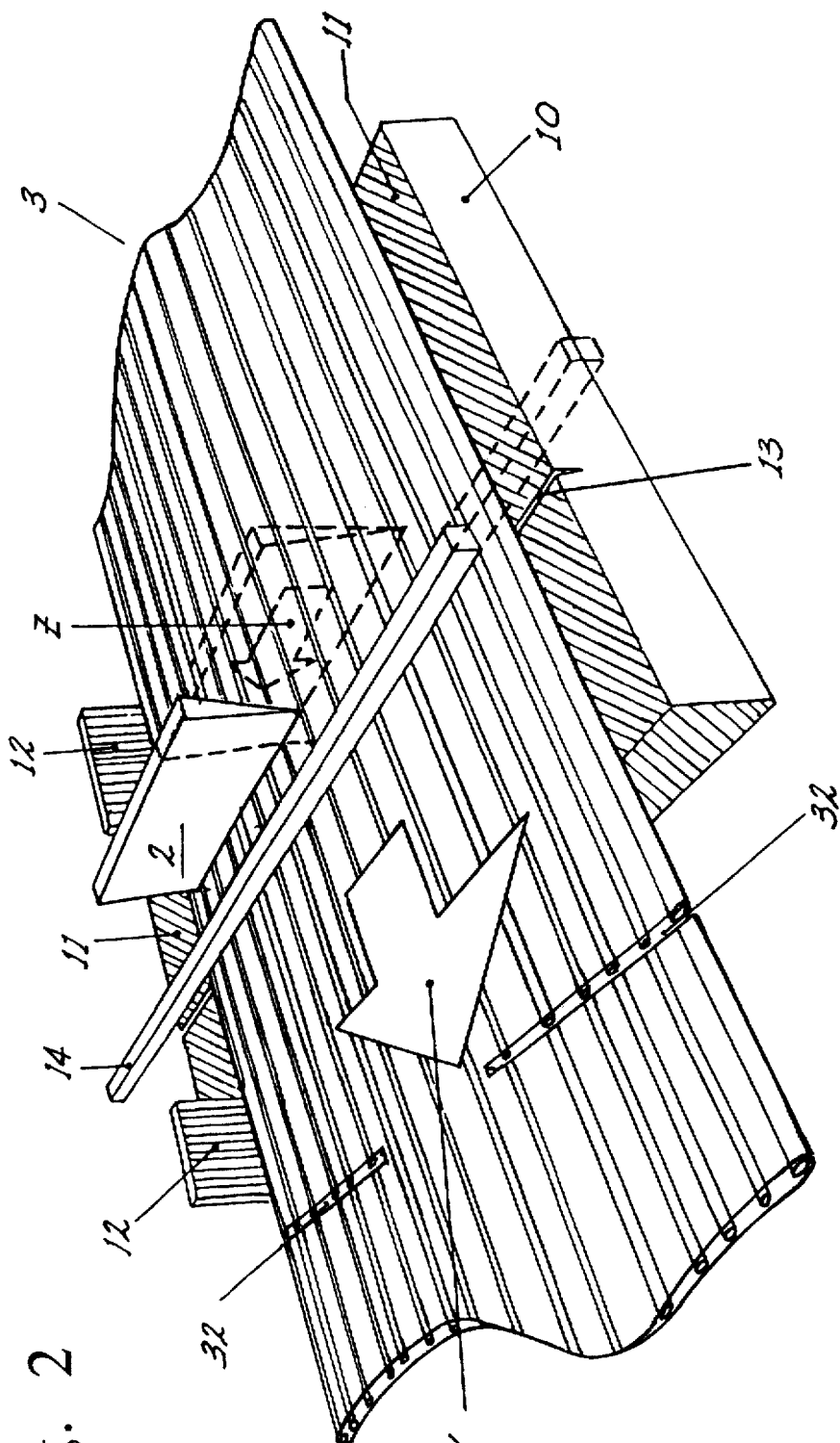
FIG. 2 shows the same cutting device at a later stage of operation.

In FIG. 1, the basic parts of a cutting device 1 are shown including a reference holder 10. To implement the invention, it is proposed to start with a ply 3 comprised of parallel cords 30 embedded in a calendering rubber 31. Such a ply 3 is unrolled and laid flat on said holder 10, along a guiding channel 11. It is moved forward along the direction defined by the stops 12 (shown by the Y arrow in FIG. 2), the latter being parallel to the cords 30.

Device 1 is comprised of a blade 2 of width C, which is seen in FIG. 1 in solid lines in an initial position, and in hidden view in a transversely offset position. It is also comprised of a retaining bar 14 (whose right extremity is shown in the hidden view) to lock the ply 3 onto the channel 11 during the action of the blade 2. Such a device allows cutting several cords at once, by groups of adjacent cords, by adopting an appropriate cutting width (width C of the blade).

We will explain in what follows that, owing to a combination of two relative movements between the blade and the ply of cords, that is, a transversal movement crossing the cords and a longitudinal movement parallel to the cords, it is possible to make incisions 32 at all desired locations.

Preferably, several incisions 32 are aligned transversely (that is, along a direction for example perpendicular to the orientation of the cords 30 and in any case far enough away from a direction parallel to the cords). To make these incisions, we can for example move the blade 2 transversely (see Z arrow) facing several successive cutting positions, the ply 3 remaining immobile. According to one aspect of the invention, the amplitude C+B of the transversal displacement between two successive cutting positions is such that B is less than the width C of the blade (see FIG. 1). Other information concerning the choice of the width C and the choice of the distance B will be given later.

Let's note again that the holder 10 is comprised of a slot 13 positioned opposite the blade 2. The blade 2 can be moved by a movement of approaching and distancing the holder, as shown by the X arrow. This movement causes the cutting part of the blade to advance slightly beyond the surface 11 of the holder 10, thus the presence of the slot 13. This movement allows dividing up the reinforcement cords by acting like a guillotine.

Figure 3:
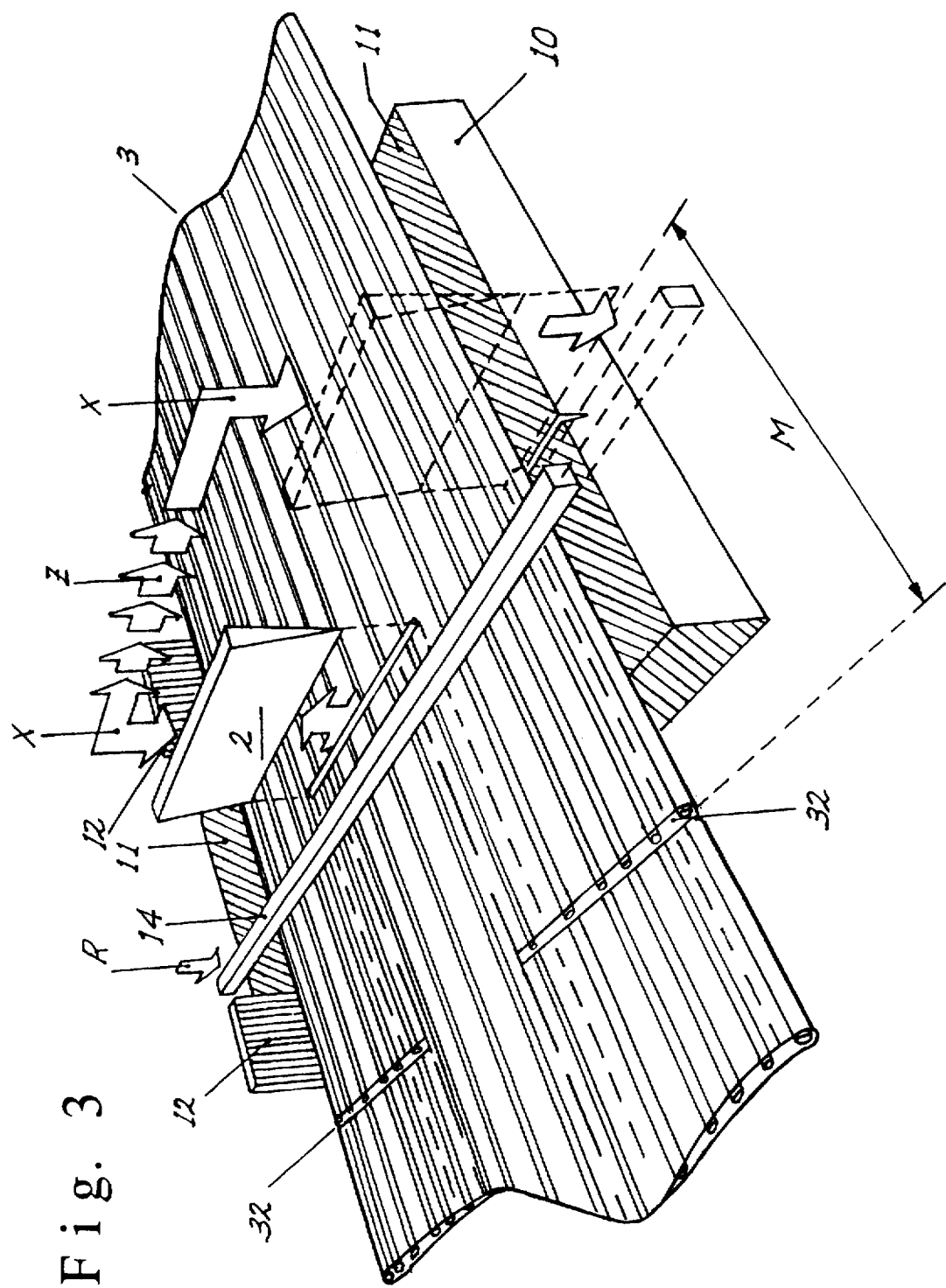
FIG. 3 shows the same cutting device at another later stage of operation.

The later forward movement of the ply 3 is a pitch-to-pitch movement. Let's note in passing that the orientation of the blade 2 is approximately perpendicular to this Y direction. The retaining bar 14 is raised according to a movement illustrated by the R arrow, then the ply 3 is moved longitudinally relative to the holder (Y direction on FIG. 2), by a preselected pitch M according to the size L of the segments which one wants to make. At the next stopping position, illustrated in FIG. 3, the retaining bar 14 is again lowered to make one or several new cuts. The first of these cuts should be done at a location offset transversely relative to the last of the cuts done before moving ply 3. More precisely, according to one aspect of the invention, it is suitable that this location be centered on the interval existing between the incisions 32 done at the previous stopping position. Here again, like previously, one can make several incisions aligned transversely by moving the blade 2 transversely each time by the same amplitude C+B such that B is less than the width C of the blade.

Gradually along the entire ply, one can thereby make cuts approximately aligned in the transversal direction, and which overlap slightly in the circumferential direction.

Figure 4:
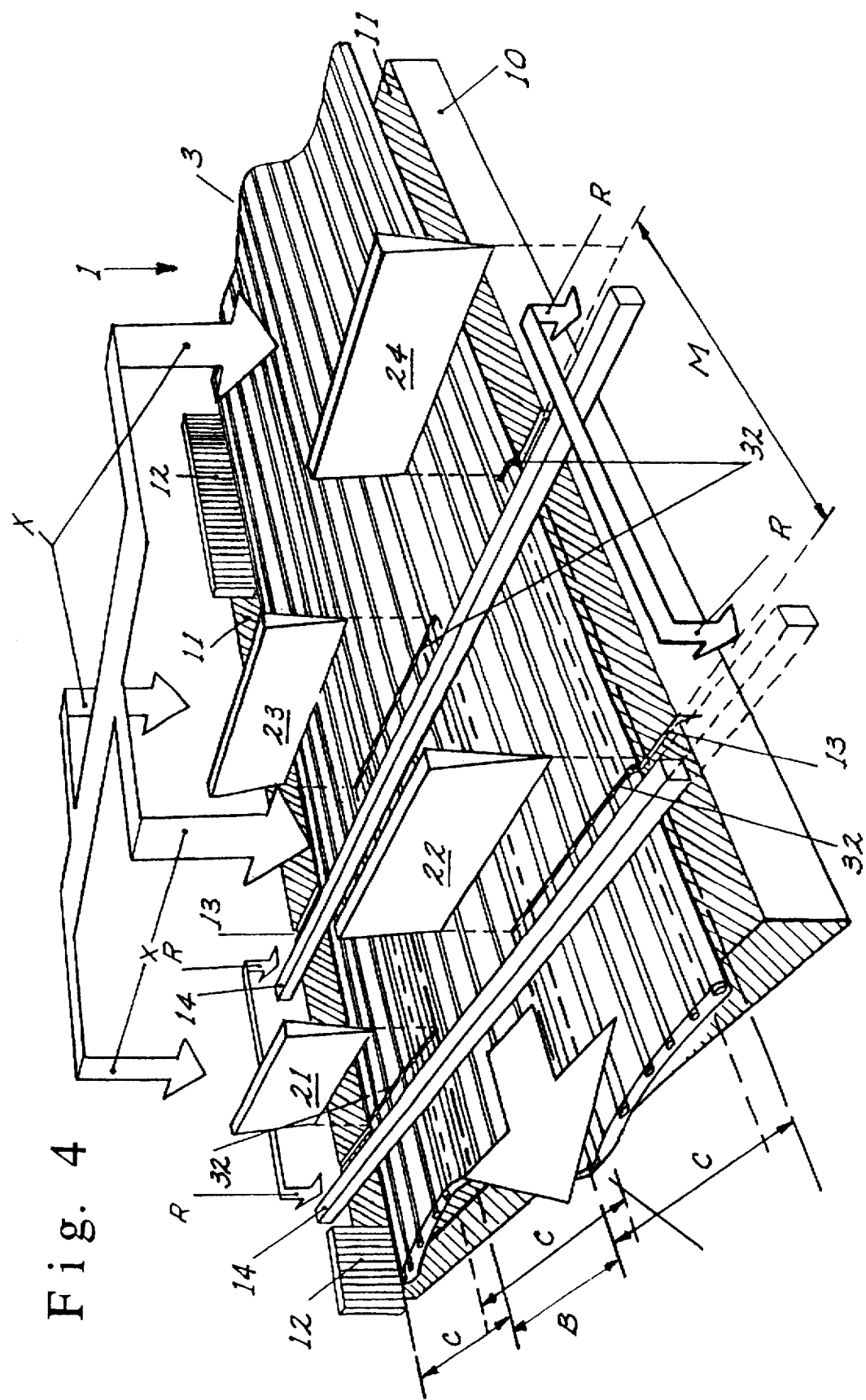
FIG. 4 shows a variation of a cutting device.

FIG. 4 illustrates a variation of the machine designed to make several incisions simultaneously, such that it is not necessary to move a blade by movements in the Z direction. The device shown here is designed to make the same arrangement of cuts as described previously. The device 1 is comprised of the number of blades necessary to make what one could call the basic arrangement of incisions. It suffices to reproduce said arrangement offset each time by a pitch in the Y direction along the entire length of the ply, the length of said pitch equal to L.

The invention also proposes a cutting device which in a single strike makes several rows of cuts aligned transversely, the cuts of one row slightly overlapping the cuts of another row when looking at said cuts in the direction of the reinforcement cords. Such a cutting device for a ply of parallel cords, comprised of a reference holder to impose a known orientation to said parallel cords, includes a first group of blades, said blades being positioned transversely relative to said known orientation, separated from each other transversely, and it includes at least one other group of blades positioned staggered relative to the blades of the first group, the blades of said second group partially extending beyond the blades of said first group, and includes the means to cause the cutting of said cords by said blades.

Device 1 shown in FIG. 4 is comprised of a first row of blades 21 and 22, and a second row of blades 23 and 24, offset transversely (that is, along Z) relative to the blades of the first row such that the blade 23 is centered on the space between blades 21 and 22. The second row is offset longitudinally (that is, along Y) relative to the first row by a distance corresponding to M. As far as the orientation of the rows of blades is concerned, it is here also approximately perpendicular to the Y direction.

The blades are all anchored on a plate, not shown in order not to overload the drawing. This plate can be moved by an approaching and distancing movement of the holder, as shown by the X arrows, whose role is entirely equivalent to the movements along X described above. This movement causes the cutting part of the blades to advance slightly beyond the surface 11 of the holder 10, thus the presents of the slots 13.

The basic cycle of the cutting device is the following. By first considering that the ply 3 is stopped, the retaining bars 14 are lowered (R arrow) to lock the ply 3 on the channel 11. The plate carrying the blades 21, 22, 23, 24 is lowered (X arrow) to make on the ply as many incisions 32 as blades. Said plate is then raised, while the ply is moved forward by a distance corresponding to the length of the segments of cords (see L on FIG. 6), then stopped again and held in this stopped position. This basic cycle is then repeated to gradually make incisions along the entire length of the ply 3. In this manner a semi-finished product is made which can be used on the servicers of tire assembly machines. As is well known, these machines include servicers used to wind predetermined quantities of reinforcement plies during tire assembly.

Let's now return to the choice of C and B. These are values set according to the structure of the tire which one wants to produce. Let's suppose for example that the reinforcement of the tire must include groups of 4 segments of length L of cords at zero degrees. The width of the blade is chosen such that the blade can cut through 6 cords, and not 4. In general, if "n" is the ideal number of cords in a group of identical segments (here n=4), then the width of a blade is chosen such that the blade is capable of cutting through at least one additional cord on both sides of the group. On the figures illustrating the invention, one sees that C corresponds to 4+2=6 cords. The distance between blades of one row is set according to the number "n" of cords that a group should include. In this example, this minimum number has been set at 4, and it influences the choice of the distance B, which should correspond to this number "n" of cords. Concerning the distance M (distance between two rows of blades or pitch of the forward movement in the device of the first variation), it corresponds here to half of the length L chosen for each segment of cords.

One could use a single row comprised of several blades. In this case, the plate carrying the blades must be able to be moved transversely to make staggered cuts. One can thereby construct a device which, referring to FIG. 4, would only be comprised of blades 21 and 22, or more generally speaking the number of blades sufficing to make in a single guillotine movement all of the cuts of a row of cuts.

Such a cutting device for a ply of parallel cords, including a reference holder 10 to impose a known orientation to said parallel cords, is comprised of a group of blades 21, 22 of width C, separated from each other transversely by a distance less than C, said blades 21, 22 being positioned transversely relative to said known orientation, the device including the means for causing the cutting of said cords by said blades, and including the means for moving transversely said blades relative to the holder by a pitch of a distance less than said width C, and the means for moving longitudinally said ply relative to said holder. It is in fact necessary to move the blades both transversely and longitudinally relative to the ply between two cuts.

It goes without saying that one can conceive of numerous variations to the principle of pre-cutting of plies which has just been presented. One could use more than two rows. For example, one can reproduce in the same way the two rows of blades to pre-cut twice as many incisions in each movement of the plate toward the holder, to accelerate the preparation of the ply without accelerating the operating rate of the device.

Figure 5:
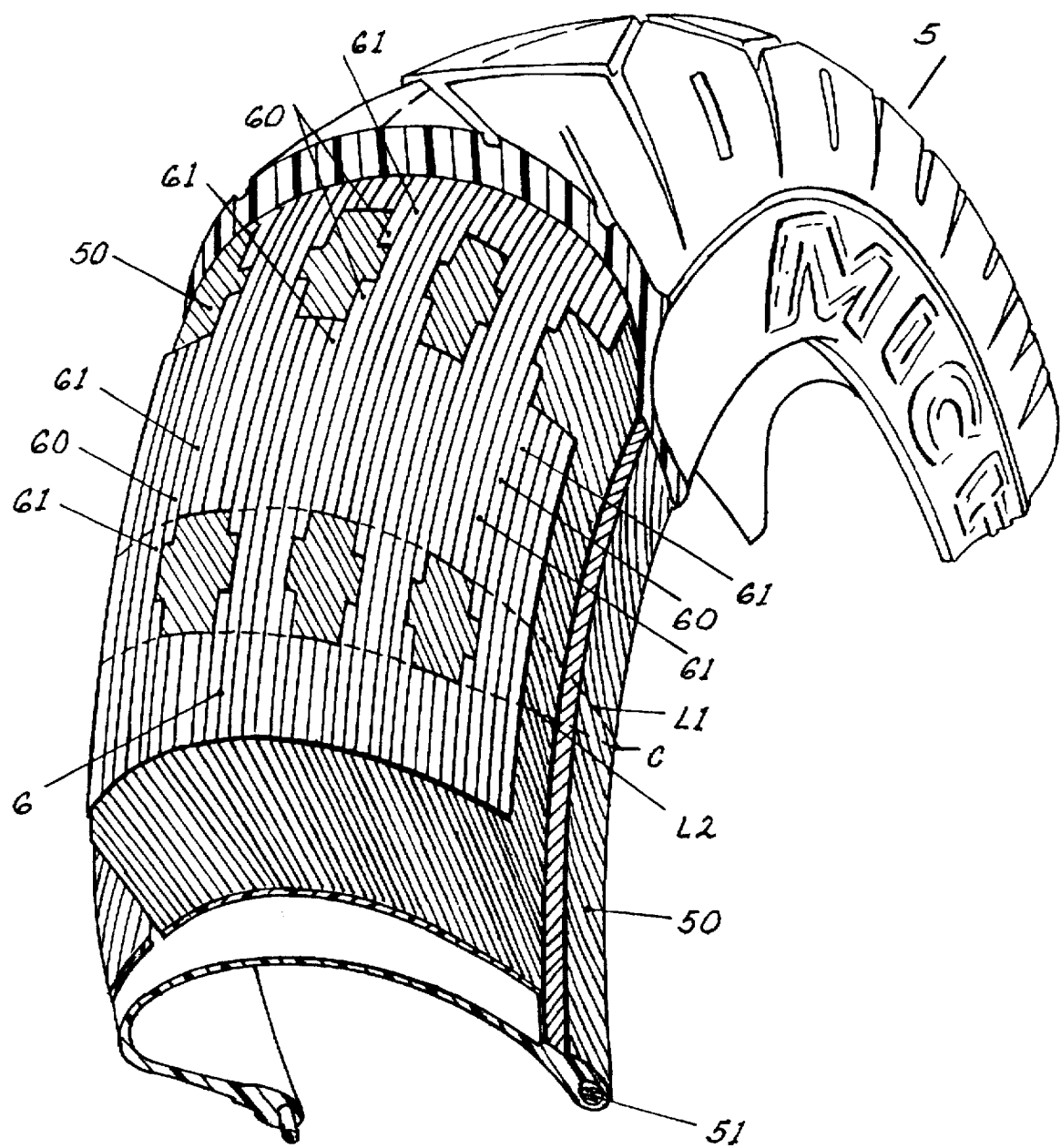
FIG. 5 is a cut-away view of a tire according to the invention.

FIG. 5 shows a tire, with a cut-away view leaving visible the appearance of the reinforcement comprised of cords at zero degrees after shaping and vulcanization. One sees that the tire 5 includes two crossed casing plies 50, turned up around the beads 51. It includes a belt 6 laid during assembly of the tire by winding of one turn of a ply prepared as indicated above.

Figure 6:
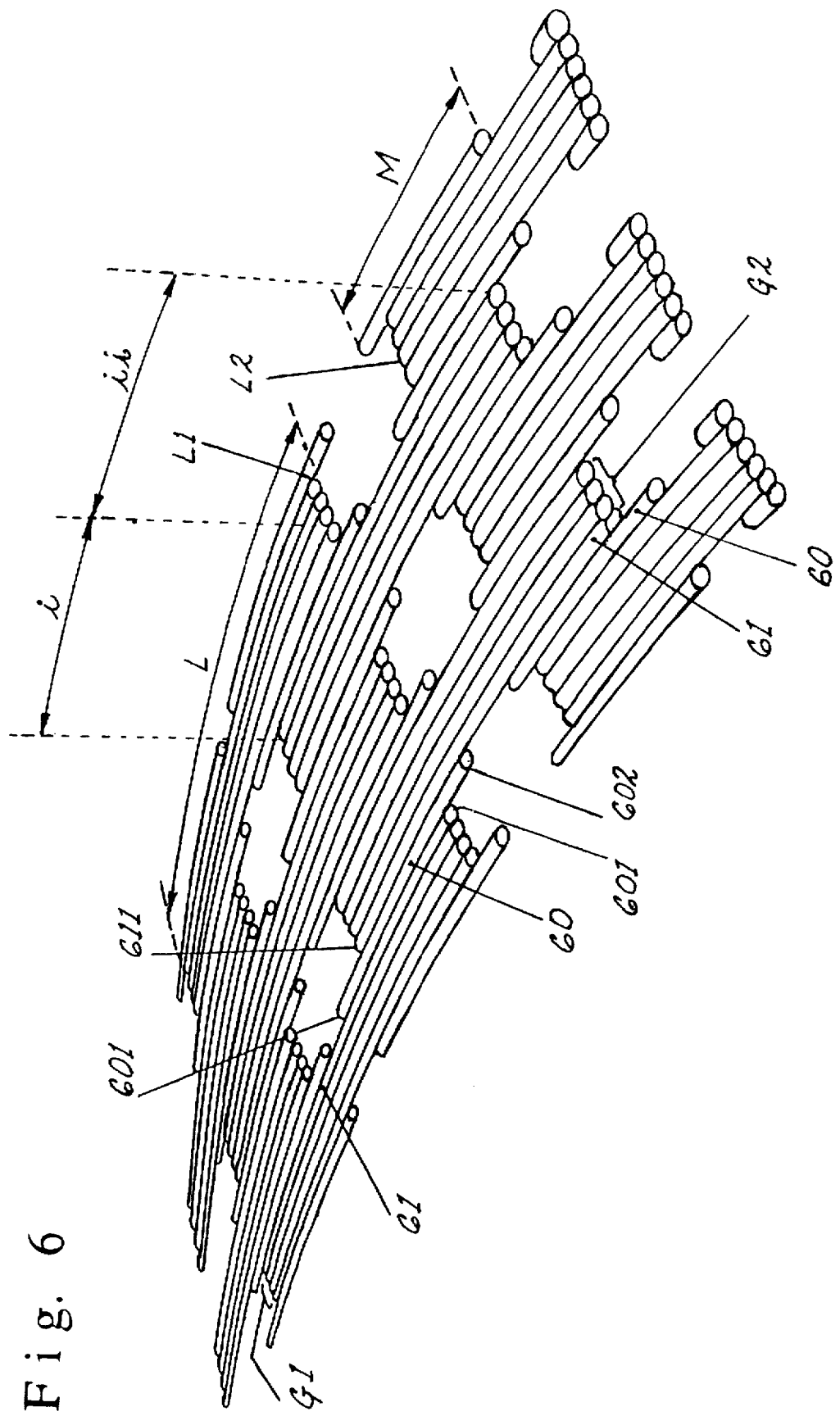
FIG. 6 shows the appearance which a ply prepared according to the principle of the invention takes after shaping.

FIG. 6 shows the cords of a pre-cut ply according to the principle of the invention, and shaped as it can appear inside a tire. If no cord escaped from the blades during the operation of pre-cutting the ply, then the ply has the following arrangement in a repetitive way: an intermediate segment 60 of length L/2 (here only one), bordered laterally on each side by a lateral segment 61 of length greater than L, each of said lateral segments being positioned in part (i) co-extensive with an intermediate segment and in part (ii) extending circumferentially beyond only one of the extremities of said intermediate segment, respectively 601 and 602. Part (ii) is the complementary part of part (i) on each lateral segment 61. Said extending beyond parts (ii) of each of the lateral segments 61 are situated circumferentially each on only one side of said intermediate segment 60, and respectively on both sides of the intermediate segment 60. Said extending beyond parts (ii) are themselves bordered laterally by another intermediate segment.

During shaping, the sides L1 and L2 of the incisions will separate from each other, allowing a casing ply 50 to appear in FIG. 5. Let's again note that in FIG. 5, broken lines show the evolution of the position of the sides L1 and L2. The intersection of these lines at point C corresponding to the diameter of positioning of a ply during confection of the tire. The intermediate segments 60 will undergo shearing due to the opposing movements of groups G1 and G2 of segments which border them laterally. Each intermediate segment 60 will take a position included between the following two limits: extremity 601 can be found aligned with extremities 611 or even extremity 602 can be found aligned with extremities 612. In general, the final position will most often be close to a median position between these extreme positions, as shown in FIGS. 5 and 6.

Owing to this invention, if one or another of the precutting operations does not occur as explained, the consequence will be that, locally, there will not be an intermediate cord 60, one of the adjacent groupings having one more cord than expected, therefore 5 instead of 4 in the example given. This does not in any way harm the quality of the tire. The invention therefore proposes a technique of realization which accepts a wide tolerance on the position of the blade or blades relative to the position of the cords in the ply. The reinforcement designed according to the principle which has just been presented can be used at any location in the structure of reinforcement of a tire, for example in a sidewall or in a belt, just to cite the most common applications.

I claim:

1. Tire whose structure of reinforcement is comprised of approximately rectilinear segments of cords disposed parallel to each other and inclined with respect to the circumferential direction of the ply at a given angle α, each segment having two extremities, said segments being disposed in such a way to include the following repetitive arrangement: one or several intermediate segments of length M, bordered laterally on each side by a lateral segment of length L greater than M, each of said lateral segments being disposed in part coextensive with an intermediate segment and in part extending beyond one of the extremities of said intermediate segment, said extending beyond parts of each of the lateral segments being situated circumferentially each on only one side of said intermediate segment or segments, and inclined with respect to the circumferential direction of the ply at said angle α respectively on each side of said intermediate segment or segments, each of the extending beyond parts itself being bordered laterally by another intermediate segment.

2. Tire according to claim 1, in which the lateral segments are disposed by groups of adjacent segments of identical length.

3. Tire according to claim 1, including a single intermediate segment for each arrangement.

4. Tire according to claim 1, in which said length L of the lateral segments is about twice the length M of the intermediate segments.

5. Tire according to claim 1, in which said angle α is included between 0° and 20°.

6. Tire according to claim 2, including a single intermediate segment for each arrangement.

7. Tire according to claim 2, in which said length L of the lateral segments is about twice the length M of the intermediate segments.

8. Tire according to claim 3, in which said length L of the lateral segments is about twice the length M of the intermediate segments.

9. Tire according to claim 2, in which said angle α is included between 0° and 20°.

10. Tire according to claim 3, in which said angle α is included between 0° and 20°.

11. Tire according to claim 4, in which said angle α is included between 0° and 20°.

12. Tire according to claim 6, in which said length L of the lateral segments is about twice the length M of the intermediate segments.

* * * * *